United States Patent [19]

Namiki

[11] Patent Number: 5,435,539
[45] Date of Patent: Jul. 25, 1995

[54] DRIVING FORCE TRANSMITTING APPARATUS

[75] Inventor: Hiroaki Namiki, Yokohama, Japan

[73] Assignee: Canon Kabushiki Kaisha, Tokyo, Japan

[21] Appl. No.: 22,600

[22] Filed: Feb. 17, 1993

Related U.S. Application Data

[63] Continuation of Ser. No. 942,092, Sep. 8, 1992, abandoned, which is a continuation of Ser. No. 533,863, Jun. 6, 1990, abandoned.

[30] Foreign Application Priority Data

Jun. 8, 1989 [JP] Japan .................. 1-144244

[51] Int. Cl.⁶ ............................. B65H 3/06
[52] U.S. Cl. .................... 271/114; 271/116
[58] Field of Search .............. 271/114, 116; 192/26, 192/81 C, 41 S, 113 R

[56] References Cited

U.S. PATENT DOCUMENTS

| | | | |
|---|---|---|---|
| 1,847,867 | 3/1932 | Dodge | 192/81 C |
| 2,615,543 | 10/1952 | Maeser | 192/81 C |
| 2,669,331 | 2/1954 | Dudis et al. | 192/17 |
| 3,128,864 | 4/1964 | Hungerford | 192/81 C |
| 3,729,077 | 4/1973 | Torigai | 192/81 C |
| 4,280,606 | 7/1981 | Taylor | 192/81 C |
| 4,306,713 | 12/1981 | Avritt et al. | 271/37 |
| 4,934,686 | 6/1990 | Ono | 271/116 X |

FOREIGN PATENT DOCUMENTS

| | | | |
|---|---|---|---|
| 478084 | 10/1951 | Canada | 192/41 S |
| 307245 | 3/1989 | European Pat. Off. | |
| 2123811 | 12/1978 | Germany | |
| 57-200732 | 9/1982 | Japan | |
| 58-211023 | 8/1983 | Japan | |
| 60-098223 | 1/1985 | Japan | |

Primary Examiner—David H. Bollinger
Attorney, Agent, or Firm—Fitzpatrick, Cella, Harper & Scinto

[57] ABSTRACT

The present invention provides a driving force transmitting apparatus comprising a first rotary member having grooves formed in an outer peripheral surface thereof, a second rotary member having an outer peripheral surface of substantially the same diameter as that of the first rotary member, and a coil spring wound around the outer peripheral surfaces of the first and second rotary members.

19 Claims, 7 Drawing Sheets

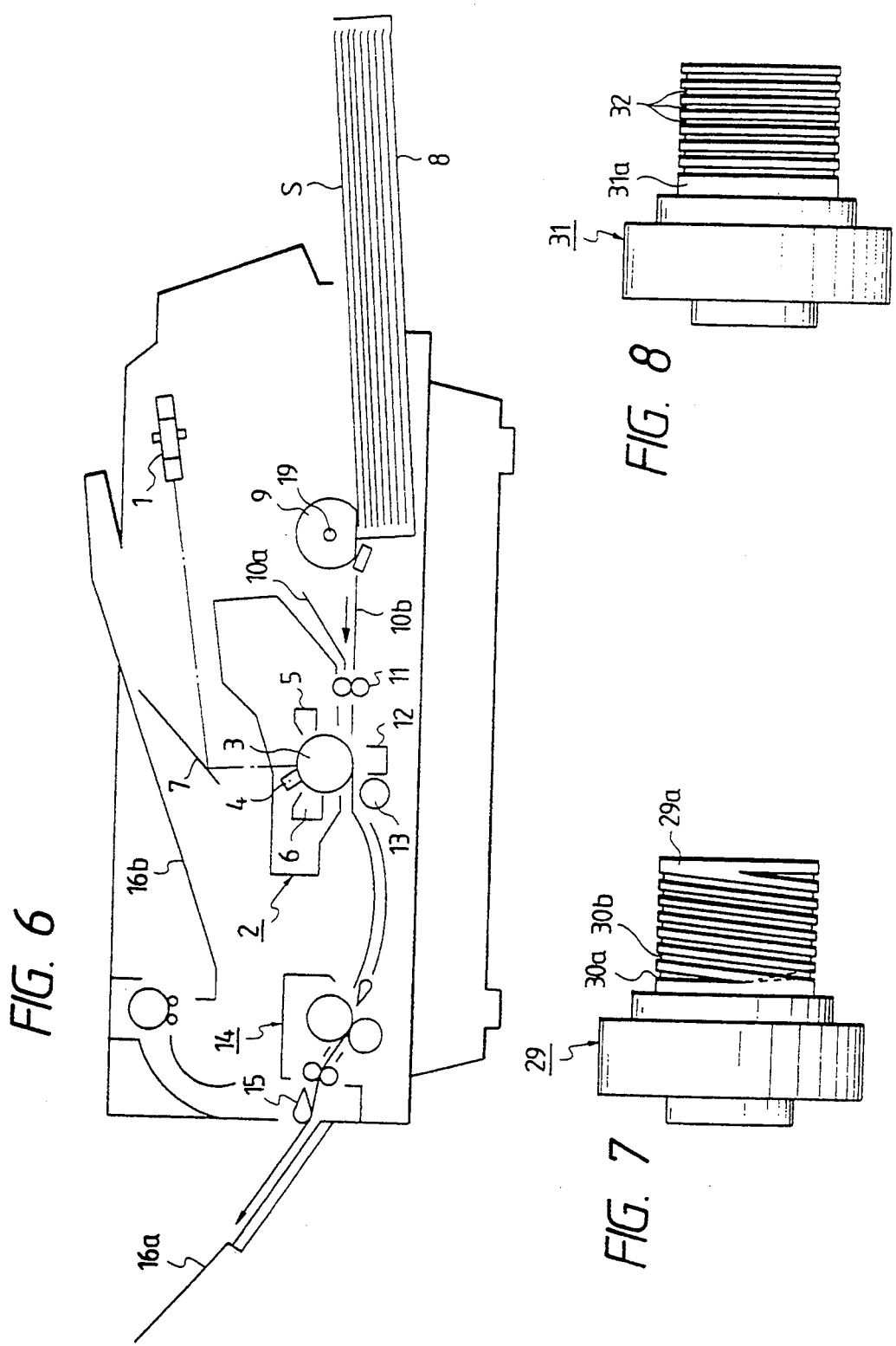

DRIVING FORCE TRANSMITTING APPARATUS

This application is a continuation of application Ser. No. 07/942,092, filed Sep. 8, 1992, which is a continuation of application Ser. No. 07/533,863, filed Jun. 6, 1990, now both abandoned.

BACKGROUND OF THE INVENTION

1. Field of the Invention

The present invention relates to a driving force transmitting apparatus using a spring clutch adapted to be used with a sheet feeding system and the like.

2. Related Background Art

In the past, since spring clutches have simple constructions and are inexpensive, they have been used as driving force transmitting apparatuses with various systems in various technical fields.

Under the circumstances, in an image forming system such as a copying machine, laser beam printer or the like, a spring clutch has been used for permitting and prohibiting the transmission of a driving force from a motor to a supply roller for supplying or feeding out sheets one by one from a cassette in which a plurality of sheets are stacked.

For example, as shown in FIG. 10, in a sheet feeding system adopted to a laser beam printer, a sheet material S fed by a supply roller 50a is guided by guide plates 52a and 52b disposed at a downstream side with respect to a sheet feeding direction (referred to as merely "downstream side" hereinafter) until it reaches temporarily stopped regist rollers 53, where the skew-feed of the sheet is corrected by abutting a leading end of the sheet against the regist rollers. Then, by rotating the regist rollers, the sheet S is fed to a recording portion of the printer.

As shown in FIGS. 11A, 11B and 12, a spring clutch is attached to one end of a rotary shaft 51 of the supply roller 50a. An input gear 54 is freely rotatably mounted near the end of the rotary shaft 51, which gear is meshed with and rotated by a gear connected to a driving motor (not shown). Further, a cylindrical output boss 55 acting as a driving force transmitting member is inserted on and fixed to the end of the rotary shaft 51. The gear 54 and the output boss 55 have cylindrical portions 54a and 55a, respectively, which have substantially the same diameters and are disposed adjacent to each other. A clutch spring 56 is fitted on outer circumferential surfaces of the cylindrical portions 54a, 55a.

Further, a control cylinder 57 having a notch 57a formed therein is arranged around the clutch spring 56 and is press-fitted onto the cylindrical portions. The control cylinder has an integral projection 57b formed thereon, against which an actuator 58 driven by a solenoid (not shown) can be engaged or disengaged.

One end 56a of the clutch spring 56 is cocked in upright relation with the cylindrical portion 54a to engage the notch 57a of the control cylinder 57, and the other end 56b of the spring is fitted into a recess 55c formed in a flange portion 55b having a larger diameter than that of the cylindrical portion 55a of the output boss 55.

While the input gear 54 is rotated by the motor (not shown), since the actuator 58 is engaged by the projection 57b, the control cylinder 57 cannot be rotated, with the result that the input gear 54 is idly rotated due to the slip between the input gear 54 and the clutch spring 56.

When a sheet feed signal is given from a controller (not shown), the solenoid is energized to attract the actuator 58, thereby disengaging the latter from the projection 57b.

Accordingly, the clutch spring 56 is tightened against the cylindrical portions 54a, 55a by a tightening force thereof and a friction force between the spring and the input gear 54, whereby the clutch spring 56, output boss 55 and rotary shaft 51 are rotated altogether. As a result, the supply roller 50a fixed to the rotary shaft 51 is also rotated to feed the sheet material S.

However, in the above conventional technique, as shown in FIG. 13, since the one end 56a of the spring clutch 56 is engaged by the notch 57a of the control cylinder 57, the rotation force of the input gear 54 causes the inner diameter of the clutch spring 56 to increase, thus reducing the tightening force of the clutch spring 56 with respect to the cylindrical portion 54a. Consequently, the expansion of the inner diameter of the clutch spring 56 will be a maximum at its end near the input gear 54 and will gradually be decreased toward the other end.

In order to maintain the disengagement or non-connection condition of the clutch, a torque having a predetermined magnitude must be applied to the end 56a of the clutch spring 56. Since such torque is obtained not by an external force but by a friction force between the cylindrical portion 54a and the clutch spring 56, it is necessary that the clutch spring 56 be always slidingly contacted with the cylindrical portion 54a even when the clutch is in the disengagement condition.

As a result, there often occurs wear, scratch and/or noise due to the stick slip at portions shown by hatched lines in FIG. 13.

However, since the clutch spring 56 is fitted onto the cylindrical portion 54a, as shown in FIGS. 14A and 14B, when the clutch spring 56 is assembled on the cylindrical portion 54a, the lubricant 59 is locally retained at a surface area of the cylindrical portion 54a other than the rear where the clutch spring 56 contacts the cylindrical portion 54a, and, thus, is not supplied to the sliding portion between the clutch spring 56 and the cylindrical portion 54a.

Further, many of the used clutch springs comprise coils having rectangular cross-sections wound spirally in order to provide a transmission torque. However, since the edges of the rectangular coil or coils scrape or sweep the surface of the cylindrical portion 54a, if the lubricant 59 remains between the clutch spring and the cylindrical portion, it will be swept from the surface of the cylindrical portion 54a to worsen the lubrication feature between the clutch spring and the cylindrical portion.

On the other hand, when the cylindrical portion 54a is made of porous material to keep the lubricant into the minute holes on the cylindrical portion, since the cylindrical portion 54a has a rough surface, the contact area between the clutch spring 56 and the cylindrical portion 54a is decreased, with the result that the adequate transmission torque cannot be obtained.

Accordingly, in the past the lubricant 59 could not adequately be supplied to the sliding surface of the cylindrical portion 54a on which the clutch spring 56 was slidably moved.

SUMMARY OF THE INVENTION

An object of the present invention is to provide a driving force transmitting apparatus which can solve the afore-mentioned conventional problems and can rapidly supply lubricant to sliding surfaces by forming recesses for holding the lubricant in a surface of an input gear on which a clutch spring is slidably moved.

Means for solving the conventional problems, which is adopted to embodiments described hereinafter, comprises an input driving force transmitting member for transmitting a driving force, having a slidable cylinder including grooves formed thereon and a gear having a larger diameter than that of the slidable cylinder; an output driving transmitting member having a second slidable cylinder of substantially the same diameter as that of the afore-mentioned slidable cylinder and a flange of a diameter larger than that of the second slidable cylinder; a clutch spring mounted on both of the slidable cylinders of the input and output driving force transmitting members; and a control member mounted around an outer peripheral surface of the clutch spring and coaxial with the slidable cylinders, for permitting or prohibiting the transmission of the driving force from the input driving force transmitting member to the output driving force transmitting member.

BRIEF DESCRIPTION OF THE DRAWING

FIG. 6 is a diagrammatic elevational view of a laser beam printer incorporating the driving force transmitting mechanism therein;

FIGS. 7, 8, 9A and 9B show other embodiments of the invention, respectively.

DETAILED DESCRIPTION OF THE PREFERRED EMBODIMENTS

A sheet feeding system incorporating a driving force transmitting apparatus therein will now be explained in connection with a preferred embodiment with reference to FIGS. 1 to 6.

Figure 1:
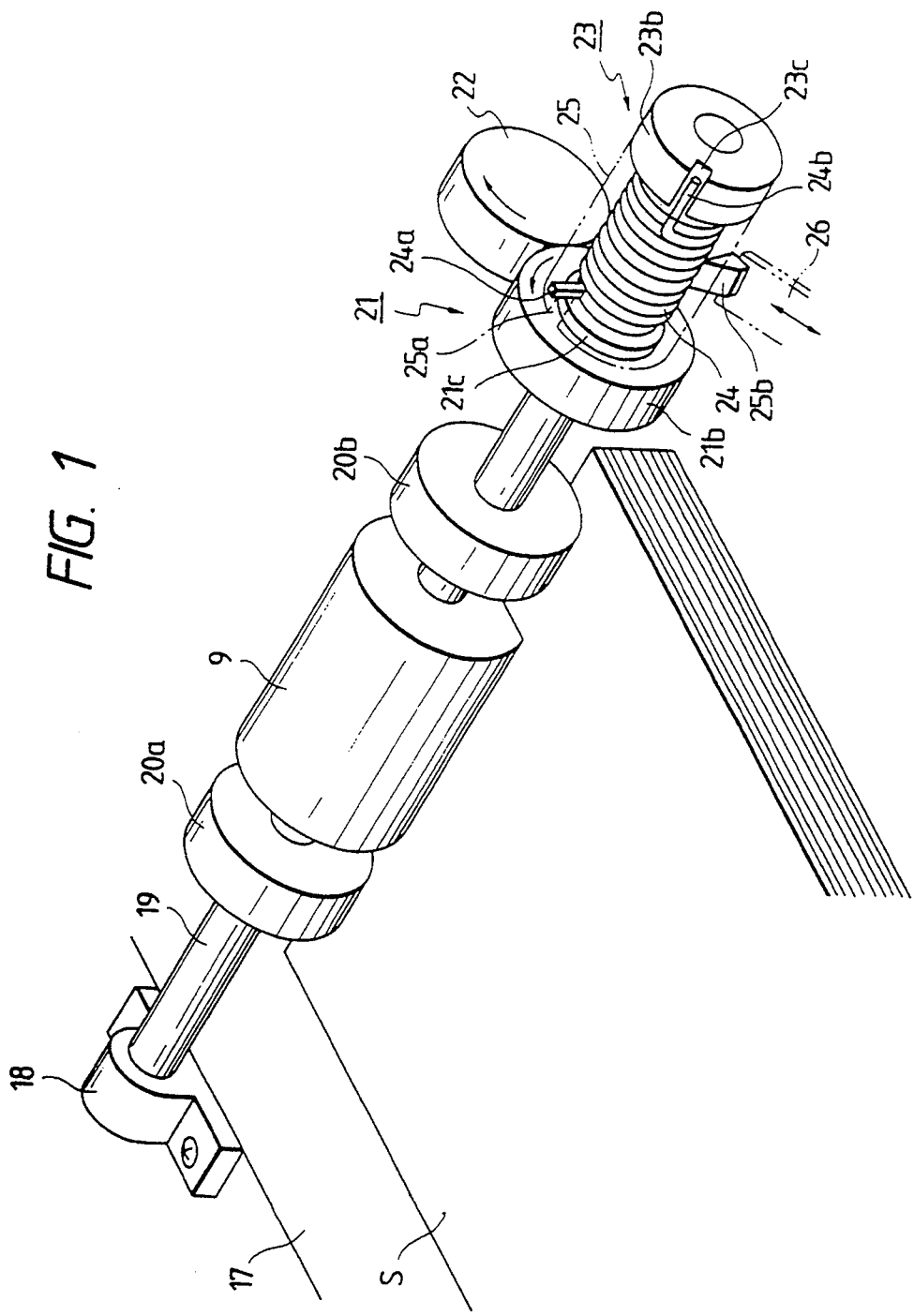
FIG. 1 is a perspective view of a driving force transmitting mechanism according to the present invention.
Figure 2A:
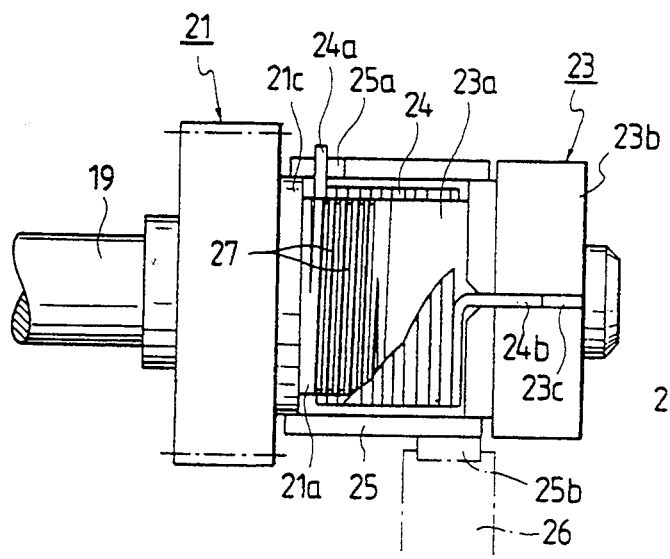
FIGS. 2A and 2B are longitudinal sectional and cross-sectional views of the driving force transmitting mechanism, respectively.
Figure 2B:
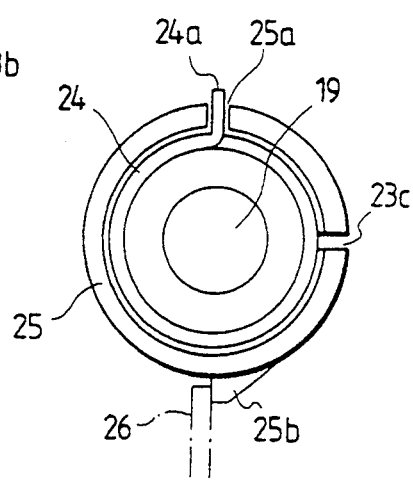
Figure 3:
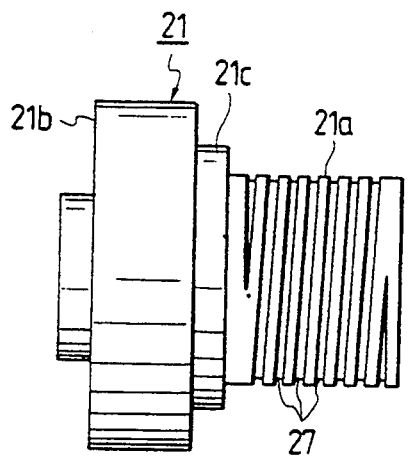
FIGS. 3, 4, 5A and 5B are views showing parts of the driving force transmitting mechanism.
Figure 4:
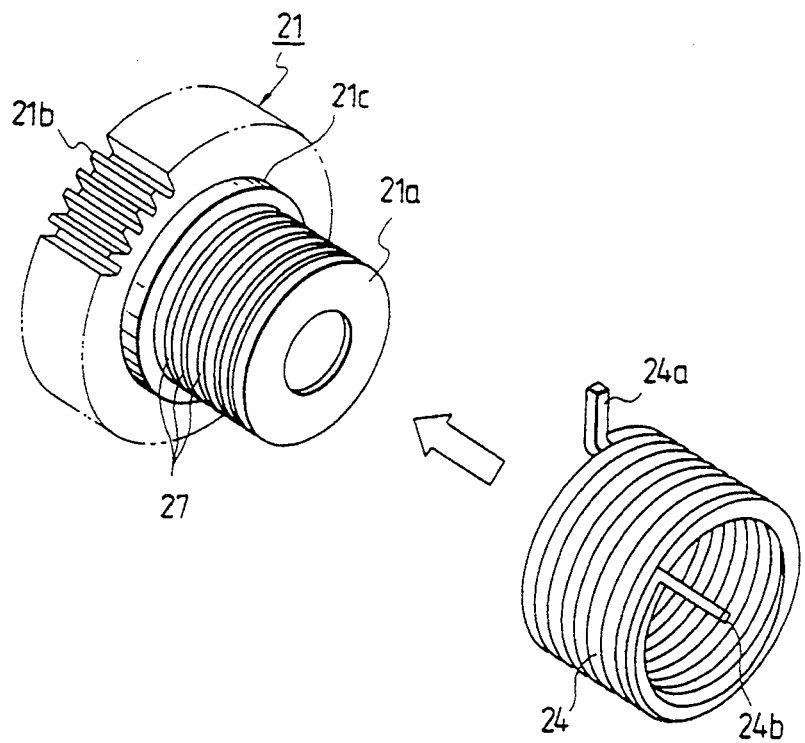

FIG. 1 is a perspective view of a driving force transmitting mechanism, FIGS. 2a and 2b partial sectional views of the driving force transmitting mechanism, FIGS. 3 to 5 are views showing parts of the driving force transmitting mechanism, and FIG. 6 is a diagrammatic elevational view of a laser beam printer incorporating the driving force transmitting mechanism therein.

First of all, a brief construction of the laser beam printer incorporating the driving force transmitting mechanism will be explained with reference to FIG. 6.

The reference numeral 1 denotes a scanner unit for illuminating a laser beam in response to an image signal; and 2 denotes a process cartridge incorporating therein an image forming means such as a photosensitive drum 3 acting as an image bearing member, a first charger 4 comprising a corona charger, a developing device 5 containing toner, a cleaner 6 and the like. The laser beam emitted from the scanner unit 1 is illuminated onto the photosensitive drum 3 previously charged by the first charger 4 in the process cartridge 2 through a mirror 7 to form a latent image. The latent image is then visualized by forming a toner image by means of the developing device 5.

On the other hand, the sheet material S fed from a cassette 8 by a supply roller 9 is guided by an upper guide plate 10a and a lower guide plate 10b to reach regist rollers 11, where the skew-feed of the sheet is corrected. Then, the sheet is intermittently fed by the regist rollers 11 to a transfer and recording portion of the laser beam printer synchronously with a leading end of the toner image formed on the photosensitive drum 3.

The reference numeral 12 denotes a transfer charger for transferring the toner image formed on the photosensitive drum 3 onto the sheet material S. After the image has been transferred to the sheet by the transfer charger 12, the sheet material S is fed to a fixing device 14 by means of feeding rollers 13. Further, after the transferred image has been permanently fixed on the sheet material S, the latter is ejected onto a tray 16a or tray 16b through a respective feeding path selected by a flapper 15.

Next, the driving force transmitting apparatus used with the above-mentioned laser beam printer will be explained with referece to FIGS. 1 and 2.

Above the sheets S stacked in the cassette 8, a rotary shaft 19 is disposed, which shaft extends transversely to the width of the sheet and is rotatably supported by a side frame 17 of the apparatus through a bearing 18 in a cantilever fashion.

The supply roller 9 of semi-circular cross-section having a downwardly directed D-shaped or semi-circular surface is fixedly mounted on the rotary shaft 19. On both sides of the supply roller 9, idle rollers 20a and 20b which can be engaged by an uppermost sheet S on the sheet stack contained in the cassette 8 are freely rotatably mounted on the shaft 19. The idle rollers 20a and 20b are abutted against the uppermost sheet S when the apparatus is in a waiting condition.

Further, a slidable cylinder 21a, and an input gear (input driving force transmitting member) 21 on which a gear 21b having a larger diameter than that of the slidable cylinder 21a are freely rotatably mounted on the rotary shaft 19. The input gear 21 is meshed with and driven by a gear 22 driven by a motor (not shown) arranged in the vicinity of the gear 21a.

Further, on the free end of the rotary shaft 19, an output boss (output driving force transmitting member) 23 having a slidable cylinder 23a of substantially the same diameter as that of the slidable cylinder 21a and having an integral flange portion 23b of a larger diameter than that of the slidable cylinder 23a is fixedly mounted. The slidable cylinders 21a and 23a are arranged on the rotary shaft 19 in an abutment relation with each other.

On the outer peripheral surfaces of the opposed slidable cylinders 21a and 23a of the input gear 21 and the output boss 23, a clutch spring 24 is mounted. A control sleeve (control member) 25 is disposed around the clutch spring 24 with an adequate clearance between the spring and the sleeve and is rotatably mounted between the gear 21b and the flange portion 23b.

The clutch spring 24 is press-fitted onto the opposed slidable cylinders 21a and 23a of the input gear 21 and the output boss 23, and an end 24a of the spring near the slidable cylinder 21a is cocked in an upright relation with respect to the slidable cylinder 21a to enter into a notch 25a formed in the control sleeve 25. Further, the other end 24b of the clutch spring 24 near the slidable cylinder 23a is fitted into a recess 23c formed in the flange portion 23b. A projection 25b is integrally formed on the outer peripheral surface of the control sleeve 25.

An actuator 26 driven by a solenoid (not shown) is arranged in opposed relation to the projection 25b to engage or disengage from the latter. The actuator 26 is engaged by the projection when the solenoid is di-energized, and when the solenoid is energized it attracts the actuator 26 to disengage it from the projection 25b.

Next, a construction of the input gear 21 will be explained with reference to FIGS. 2 and 3.

In the outer peripheral surface of the slidable cylinder 21a on which the clutch spring 24 is mounted, a spiral groove 27 is formed for filling or containing lubricant such as oil. Between the slidable cylinder 21a and the gear 21b, there is provided a shoulder 21c on which an end portion of the control sleeve 25 is slidably fitted.

Figure 5A:
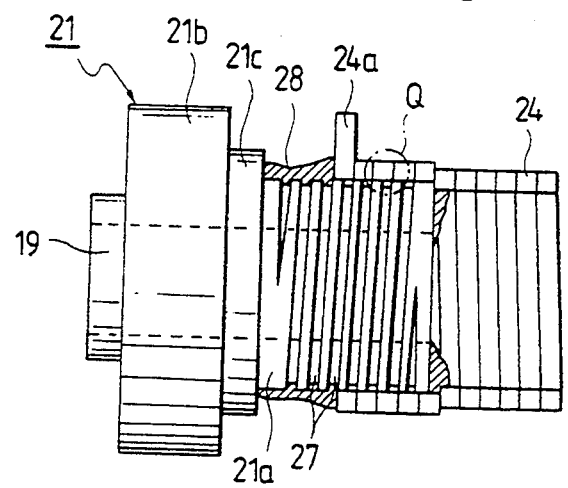

When the clutch spring 24 is assembled on the slidable cylinder 21a, as shown in FIG. 4, the lubricant 28 is previously filled in the groove 27, and then the clutch spring 24 is fitted onto the slidable cylinder from the thrust direction. In this case, as shown in FIG. 5A, the lubricant 28 on the outer surface of the slidable cylinder 21a is swept toward the shoulder 21c and enters into the spiral groove 27.

In the waiting condition, the input gear 21 is rotated by the gear which is driven by the motor (not shown), and thus the clutch spring 24 and the control sleeve 25 engaged by the spring at its one end tend to rotate. However, since the actuator 26 is engaged by the projection 25b, the control sleeve 25 cannot be rotated and only the rotational force is transmitted. Further, since the end 24a of the clutch spring 24 is engaged by the notch 25a of the control sleeve 25, the rotational force causes an inner diameter of the clutch spring 24 to increase, thus decreasing the fastening force of the spring acting against the slidable cylinder 21a.

When the rotational force of the input gear 21 exceeds the maximum stationary friction force between the clutch spring 24 and the slidable cylinder 21a, the slip occurs between the input gear 21 and the clutch spring 24, causing the input gear 21 to freely rotate. In this case, the lubricant 28 retained in the groove 27 will contact the inner peripheral surface of the clutch spring 24 at the upper portion of the groove 27.

Figure 5B:
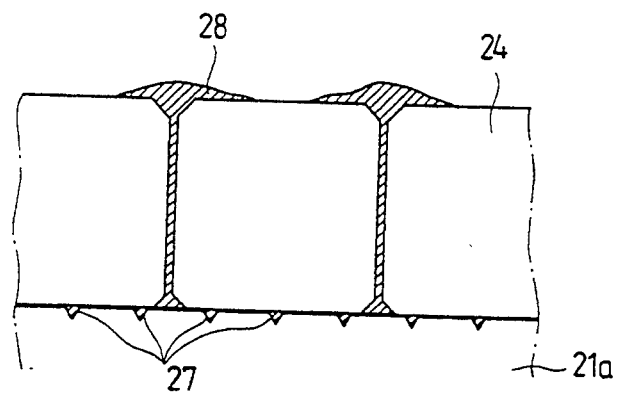

Since the groove 27 is formed spirally, it is possible to quickly form a film of the lubricant 28 on the sliding surfaces between the slidable cylinder 21a and the clutch spring 24 in consequence of the free rotation of the input gear 21. In particular, with the spiral configuration, in order to prevent the clutch spring 24 from entering into the groove 27 and to improve the lubricant ability, as shown in FIG. 5B (showing a portion of FIG. 5A in an enlarged scale), it was found that the effective result could be obtained when each coil of the clutch spring stranded two or three spiral grooves, and, in effect, the spiral grooves had a pitch of 200μ to 300μ.

Further, since a portion which must be lubricated is an area near a distal end 21d of the slidable cylinder 21a, if the spiral groove 27 is formed to direct the lubricant 28 from the shoulder 21c to the distal end 21d, it will be possible to facilitate the supply of the lubricant 28 to the sliding surface between the clutch spring 24 and the slidable cylinder 21a and to supply the lubricant thereto for a long time.

Incidentally, as shown in FIG. 3, it is possible to minimize the loss in the end 21d and the variation in the sliding torque by providing a non-grooved portion at an end portion of the slidable cylinder 21a near the end 21d.

When the sheet feed signal is given from the controller (not shown), the solenoid (not shown) is energized to attract the actuator 26, thereby disengaging the latter from the projection 25b.

Consequently, the clutch spring 24 is tightened against the slidable cylinders 21a and 23a by the tightening force of the spring itself and the friction force between the spring and the input gear 21. In this way, the clutch spring 24, output boss 23 and rotary shaft 19 are rotated altogether, whereby the supply roller 9 can feed the sheet S one by one.

In this case, the lubricant 28 forming the lubricant film on the slidable cylinder 21a is quickly returned to the groove 27 and to the spaces formed between the coils of the clutch spring 24.

Another embodiment of an input gear 21 will be explained with reference to FIGS. 7 to 9.

In general, it is troublesome to form a single spiral groove 27 in the peripheral surface of the slidable cylinder 21a. Accordingly, as shown in FIG. 7, two spiral grooves 30a, 30b are simultaneously formed in the peripheral surface of a slidable cylinder 29a of an input gear 29. With this arrangement, the time for forming the grooves in the peripheral surface of the slidable cylinder 29a can be reduced by ½.

Alternatively, as shown in FIG. 8, annular grooves 32 may be formed in the peripheral surface of a slidable cylinder 31a of an input gear 31 by the knurling. With this arrangement, since grooves 32 are annular, the less movement of the lubricant filled in the grooves is obtained, whereby it is possible to suppress the variation in the sliding torque between the clutch spring 24 and the slidable cylinder 21a to a minimum. Further, the manufacturing time can be reduced due to the knurling operation, thereby making the apparatus inexpensive and improving the productivity.

Figure 9A:
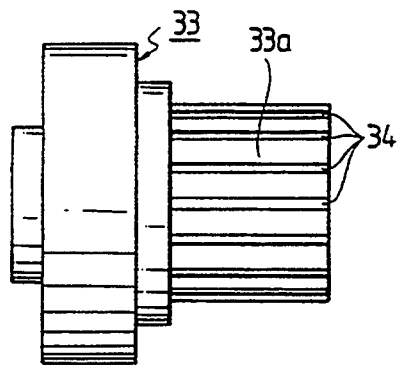
Figure 9B:
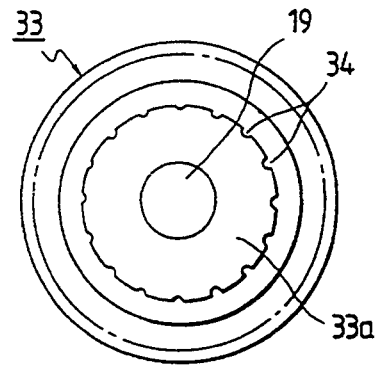
Figure 10:
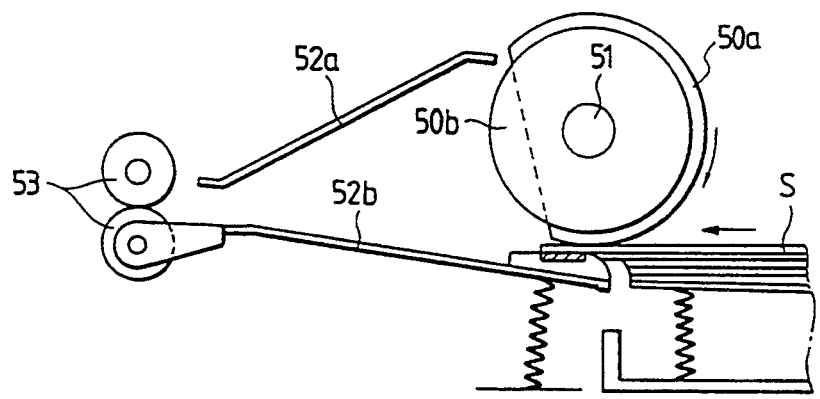
FIGS. 10, 11A and 11B, 12, 13, 14A and 14B show a conventional driving force transmitting apparatus.
Figure 11A:
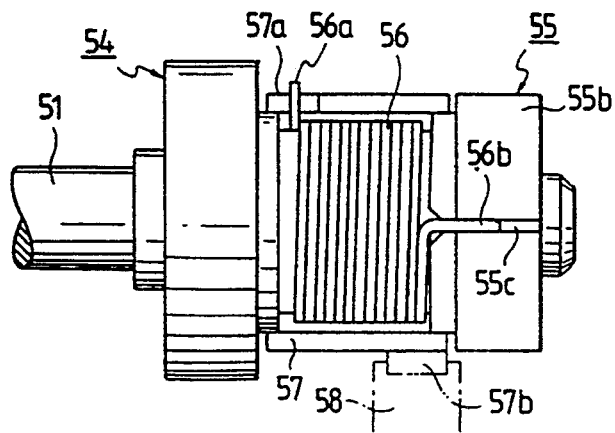
Figure 11B:
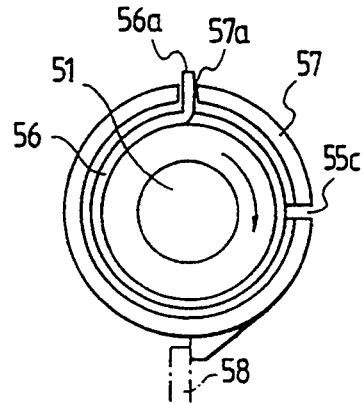
Figure 12:
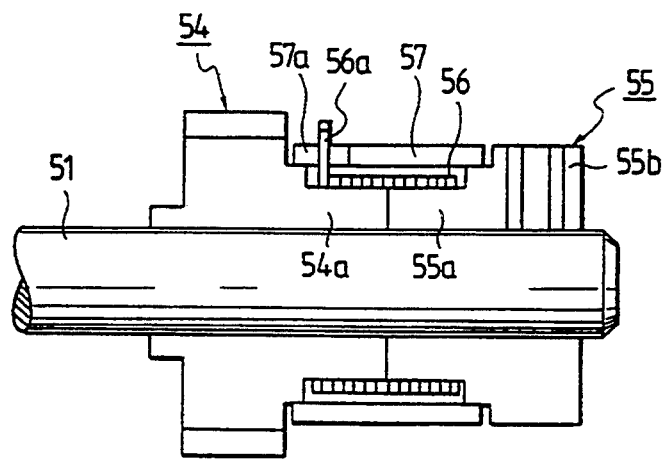
Figure 13:
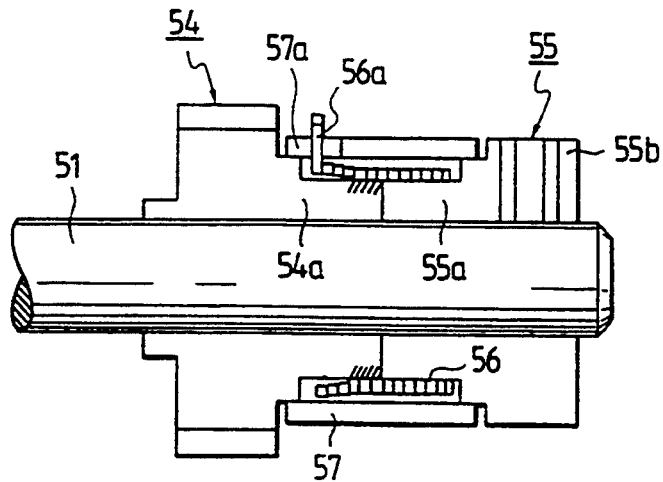
Figure 14A:
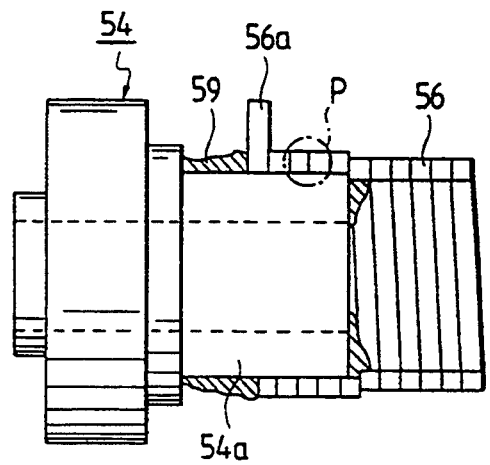
Figure 14B:
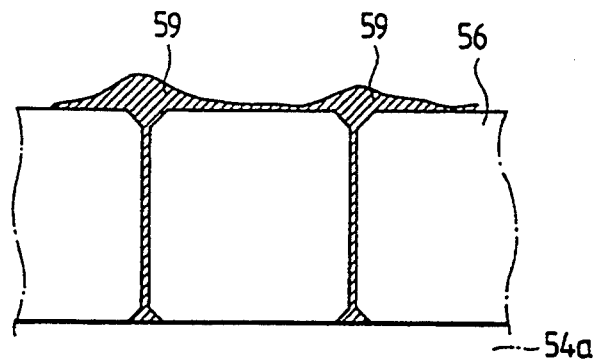

Alternatively, as shown in FIG. 9A, a plurality of grooves 34 may be formed on the peripheral surface of a slidable cylinder 33a of an input gear 33 in parallel with the rotary shaft 19. As shown in FIG. 9B, the grooves are disposed around the circumference of the slidable cylinder 33a at a predetermined angular pitch.

With this arrangement, since the grooves can be obtained by a molding operation, the productivity is further improved. However, since grooves are formed in the direction perpendicular to a direction to which the clutch spring 24 slides, it is preferred that ridged edges of the grooves should be eliminated by the barrel finishing and the like in order to facilitate the formation of the lubricant film and to minimize the variation of the sliding torque.

Incidentally, it is desirable to form the grooves by sintering.

As mentioned above, according to the present invention, since the groove or grooves are formed in the peripheral surface of the slidable cylinder of the input force transmitting member onto which the clutch spring is mounted and the lubricant can previously be retained in the groove or grooves, the lubricant can be quickly supplied from the groove or grooves to the peripheral surface of the slidable cylinder on which the clutch spring slides at the non-connection condition of the clutch. Thus, it is possible to provide a spring clutch which can prevent the seizure, scratch and or abnormal wear on the sliding surface on which the clutch spring slides, and which has high stability and reliability.

Further, since the lubricant film can be quickly formed on the peripheral surface of the slidable cylinder at the non-connection condition of the clutch, it is possible to prevent the stick slip of the clutch spring to eliminate the noise, and at the same time to reduce the sliding torque of the clutch. Thus, the time required for the engagement and disengagement of the clutch (the timing of the half-clutch condition) can be reduced. Accordingly, it is possible to provide a spring clutch having a quick response.

Lastly, since the lubricant film can easily be formed on the sliding surface on which the clutch spring slides, the spring clutch can be applied to the case where the clutch is subjected to a larger load.

I claim:

1. A driving force transmitting apparatus comprising:
   a first rotary member having a diameter and having a groove formed in an outer peripheral surface thereof;
   a second rotary member having an outer peripheral surface; and
   a coil spring wound around the outer peripheral surfaces of said first and second rotary members, wherein said groove is annularly formed in said outer peripheral surface of said first rotary member.

2. A driving force transmitting apparatus according to claim 1, wherein said first rotary member has a gear which is rotated integrally with said first rotary member.

3. A drive force transmitting apparatus according to claim 2, further comprising a second gear rotated by a drive force from said drive source, with the drive force being transmitted to said first gear from said second gear.

4. A driving force transmitting apparatus according to claim 1, wherein said second rotary member has an engagement portion engaged by one end of said coil spring.

5. A driving force transmitting apparatus according to claim 1, further including a driving source for rotating said first rotary member.

6. A drive force transmitting apparatus according to claim 1, further comprising regulation means for selectively regulating an end of said coil spring opposing said first rotary member.

7. A driving force transmitting apparatus comprising:
   a first rotary member having a diameter and being rotatively driven about an axis, with said first rotary member having grooves formed in an outer peripheral surface thereof;
   a driving source for rotatively driving said first rotary member about the axis;
   a second rotary member having an outer peripheral surface of substantially the same diameter as that of said first rotary member and rotable around the axis common to said first rotary member;
   a coil spring wound around said outer peripheral surfaces of said first and second rotary members in a direction that it is tightened against said first and second rotary members when said first rotary member is rotated by said driving source; and
   a control member for selectively locking an end of said coil spring near said first rotary member, thereby controlling the tightening of said coil spring against said first and second rotary members, wherein said grooves are annularly formed in said outer peripheral surface of said first rotary member.

8. A driving force transmitting apparatus according to claim 7, wherein said second rotary member has an engagement portion engaged by one end of said coil spring.

9. An image forming system comprising:
   a driving source;
   a first rotary member having a diameter and being rotatively driven about an axis by a driving force supplied from said driving source, with said first rotary member having grooves formed in an outer peripheral surface thereof;
   a second rotary member having an outer peripheral surface of substantially the same diameter as that of said first rotary member and rotable around the axis common to said first rotary member;
   a coil spring wound around said outer peripheral surfaces of said first and second rotary members in a direction that it is tightened against said first and second rotary members when said first rotary member is rotated by said driving source;
   a control member for selectively locking an end of said coil spring near said first rotary member, thereby controlling the tightening of said coil spring against said first and second rotary members;
   a third rotary member rotated synchronously with said second rotary member to apply a rotational force to a sheet; and
   image forming means for forming an image on the sheet fed by said third rotary member, wherein
   said grooves are annularly formed in said outer peripheral surface of said first rotary member.

10. A drive force transmitting device, comprising:
    a first rotary member being rotatively driven about an axis by a drive force and having a groove annually formed on a peripheral surface thereof;
    a secondary rotary member having a smooth peripheral surface thereof; and
    a coil spring wound around the peripheral surface of said first rotary member and the smooth peripheral surface of said second rotary member.

11. A drive force transmitting device according to claim 10, wherein the groove is formed in a spiral configuration.

12. A drive force transmitting device according to claim 10, wherein the groove extends in a peripheral direction of said first rotary member.

13. A drive force transmitting device according to claim 10, wherein the groove extends in a parallel direction to a rotational axis of said first rotary member.

14. A drive force transmitting device according to claim 10, further comprising a first rotary gear rotating together with said first rotary member.

15. A drive force transmitting apparatus according to claim 14, further comprising a second rotary gear rotating by the drive force from said drive source, with the drive force being transmitted to said first rotary gear from said second rotary gear.

16. A drive force transmitting device according to claim 10, wherein said second rotary member has an engagement portion engaged by one end of said coil spring.

17. A drive force transmitting apparatus according to claim 10, further comprising regulation means for selectively regulating movement of an end of said spring opposing said first rotary member.

18. An image forming apparatus, comprising:
a first rotary member having a diameter and grooves annularly formed on an outer peripheral surface thereof;
a second rotary member having an outer peripheral surface;
a coil spring wound around the outer peripheral surfaces of said first and second rotary members;
sheet convey means driven by said second rotary member; and
image formation means for forming an image on a sheet conveyed by said sheet convey means.

19. An image forming apparatus, comprising:
a first rotary member driven about its longitudinal axis and having a groove annually formed on an outer peripheral surface thereof;
a second rotary member having a cylindrical shape and a smooth outer peripheral surface;
a coil spring wound around the outer peripheral surfaces of said first and second rotary members;
sheet convey means driven by said second rotary member; and
image formation means for forming an image on a sheet conveyed by said sheet convey means.

* * * * *

UNITED STATES PATENT AND TRADEMARK OFFICE
CERTIFICATE OF CORRECTION

PATENT NO. : 5,435,539
DATED : July 25, 1995
INVENTOR(S) : Namiki

It is certified that error appears in the above-indentified patent and that said Letters Patent is hereby corrected as shown below:

COLUMN 3:

Line 47, "partial" should read --are partial--.

COLUMN 5:

Line 7, "di-ener-" should read --de-ener- --.

COLUMN 7:

Line 31, "drive" should read --driving--.
Line 43, "drive" should read --driving--.
Line 61, "that" should read --such that--.

COLUMN 8:

Line 20, "that" should read --such that--.

Signed and Sealed this

Twenty-seventh Day of February, 1996

Attest:

BRUCE LEHMAN

*Attesting Officer*     *Commissioner of Patents and Trademarks*